US007811075B2

(12) United States Patent
Shimada

(10) Patent No.: US 7,811,075 B2
(45) Date of Patent: Oct. 12, 2010

(54) SCREW FOR EXTRUDER AND METHOD OF MANUFACTURING THE EXTRUDER, AND RUBBER MEMBER FOR TIRE AND METHOD OF MANUFACTURING THE RUBBER MEMBER

(75) Inventor: Gou Shimada, Tokyo (JP)

(73) Assignee: Kabushiki Kaisha Bridgestone, Tokyo (JP)

( * ) Notice: Subject to any disclaimer, the term of this patent is extended or adjusted under 35 U.S.C. 154(b) by 687 days.

(21) Appl. No.: 10/516,516

(22) PCT Filed: Jun. 5, 2003

(86) PCT No.: PCT/JP03/07112

§ 371 (c)(1), (2), (4) Date: Jun. 29, 2005

(87) PCT Pub. No.: WO03/103927

PCT Pub. Date: Dec. 18, 2003

(65) Prior Publication Data
US 2006/0062076 A1    Mar. 23, 2006

(30) Foreign Application Priority Data
Jun. 5, 2002  (JP)  ............... 2002-164095

(51) Int. Cl.
| | |
|---|---|
| A01J 17/00 | (2006.01) |
| A21C 1/00 | (2006.01) |
| A21C 7/00 | (2006.01) |
| A23G 1/12 | (2006.01) |
| A23G 3/14 | (2006.01) |
| A23G 9/00 | (2006.01) |
| A23P 1/00 | (2006.01) |
| A47J 43/04 | (2006.01) |
| A47J 43/10 | (2006.01) |
| B28B 17/02 | (2006.01) |
| B29B 7/00 | (2006.01) |
| B29B 13/00 | (2006.01) |
| B29C 47/36 | (2006.01) |
| B65G 33/00 | (2006.01) |

(52) U.S. Cl. ...................... 425/208; 198/657
(58) Field of Classification Search .................. 366/89, 366/323; 425/208, 376.1
See application file for complete search history.

(56) References Cited

U.S. PATENT DOCUMENTS 2,626,856 A * 1/1953 Alles (Continued)

FOREIGN PATENT DOCUMENTS

GB    872043    7/1961

(Continued)

*Primary Examiner*—Gene Crawford
*Assistant Examiner*—Ramya Prakasam
(74) *Attorney, Agent, or Firm*—Sughrue Mion, PLLC

(57) ABSTRACT

A screw 12 for an extruder 10 rotatably supported on the cylinder of the extruder and carrying roll-heated rubber material supplied from a hopper port 13s provided at the rear part of the cylinder 11, wherein the height of the portion of the flight portion 12z of the screw 12 located below the hopper port 13s is set lower than the height of the flight portion 12a on the downstream side of the screw 12, whereby the pulsation of extruded matter can be reduced while maintaining a high discharge rate.

5 Claims, 2 Drawing Sheets

U.S. PATENT DOCUMENTS

| | | | |
|---|---|---|---|
| 3,300,811 A | 1/1967 | Berger | |
| 3,701,512 A * | 10/1972 | Schippers et al. | 366/81 |
| 3,787,160 A * | 1/1974 | Leister | 425/208 |
| 3,826,477 A * | 7/1974 | Kunogi et al. | |
| 3,868,093 A * | 2/1975 | Sokolow | 366/76.6 |
| 3,913,897 A * | 10/1975 | Hanslik | |
| 3,924,841 A * | 12/1975 | Shinmoto | |
| 4,118,164 A * | 10/1978 | Wenger et al. | 425/202 |
| 4,124,306 A * | 11/1978 | Bredeson et al. | |
| 4,304,539 A * | 12/1981 | Hagiwara et al. | 425/145 |
| 4,344,710 A * | 8/1982 | Johnson et al. | |
| 4,346,652 A * | 8/1982 | de Ruyter | |
| 4,728,367 A * | 3/1988 | Huber et al. | |
| 4,838,700 A | 6/1989 | Williamson | |
| 4,944,906 A * | 7/1990 | Colby et al. | 264/101 |
| 4,981,364 A * | 1/1991 | Geyer | 366/81 |
| 5,004,352 A | 4/1991 | Tamura et al. | |
| 5,141,426 A * | 8/1992 | Capelle | 425/203 |
| 5,145,352 A * | 9/1992 | Capelle et al. | |
| 5,147,198 A * | 9/1992 | Capelle | 425/205 |
| 5,234,656 A * | 8/1993 | Kniss | |
| 5,332,314 A * | 7/1994 | Geyer | 366/82 |
| 5,836,680 A | 11/1998 | Banas et al. | |
| 5,855,929 A * | 1/1999 | Geyer | 425/204 |
| 6,013,701 A * | 1/2000 | Kunimatsu et al. | 523/351 |
| 6,227,692 B1 * | 5/2001 | Heathe | 366/81 |
| 6,331,069 B1 * | 12/2001 | Putti | 366/89 |
| 6,485,287 B1 * | 11/2002 | Sugano | 425/205 |
| 6,638,051 B2 * | 10/2003 | Yamaguchi et al. | 425/204 |
| 6,655,943 B1 * | 12/2003 | Peterson et al. | 425/114 |
| 6,705,753 B2 * | 3/2004 | Behling | 366/85 |
| 6,722,870 B2 * | 4/2004 | Putti | |
| 6,752,528 B1 * | 6/2004 | Durina | 366/88 |
| 6,790,025 B2 * | 9/2004 | Yamaguchi et al. | 425/198 |
| 6,958,128 B2 * | 10/2005 | Gates et al. | 264/211.21 |
| 7,101,166 B2 * | 9/2006 | Yamaguchi et al. | |
| 7,172,333 B2 * | 2/2007 | Anderson et al. | 366/78 |
| 2004/0202744 A1 * | 10/2004 | Bacher et al. | 425/207 |

FOREIGN PATENT DOCUMENTS

| | | |
|---|---|---|
| GB | 1095237 | 12/1967 |
| GB | 1422731 | 1/1976 |
| GB | 2001898 A | 2/1979 |

* cited by examiner

SCREW FOR EXTRUDER AND METHOD OF MANUFACTURING THE EXTRUDER, AND RUBBER MEMBER FOR TIRE AND METHOD OF MANUFACTURING THE RUBBER MEMBER

BACKGROUND OF THE INVENTION

1. Field of the Invention

The present invention relates to a screw for use in extruders and, particularly, to the structure of a screw for reducing the pulsation of an extruded product and a production process therefor.

2. Description of the Prior Art

In the prior art, to manufacture a rubber member which requires a predetermined sectional form, such as a tire tread or a side wall, an extruder comprising a screw is generally used. For instance, in the step of extruding a tire tread, a kneaded and blended rubber material for treads is heated with a warming mill to be softened, supplied to the hopper 51 of an extruder 50 shown in FIG. 3, carried to the end of a cylinder 53 and extruded from the nozzle 55 of a head 54 attached to the end of the cylinder 53 by a screw 52 to be molded into a predetermined sectional form, cooled and cut to a required length.

However, as the above extruder 50 generally has a short length (L/D), the shape of the rubber material to be molded is easily affected by the revolution of the screw 52. Therefore, when the extrusion rate (delivery rate) is increased by changing the structure of the screw, pulsation caused by delivery becomes large.

For example, when a high-delivery type screw 62 having a double-thread structure as a whole and a single-thread structure only on the hopper port 51s side is used as shown in FIG. 4, the delivery rate becomes higher than in the prior art. However, as all the rubber material supplied by the above single-thread structure portion is forced into the cylinder 53, a change in pressure applied from the rubber material to the flight portion 62F of the screw 62 become large in the vicinity of the hopper port 51s. Therefore, the pulsation of the delivered extruded product A becomes large, thereby increasing a gauge fluctuation.

Particularly when the extruded product is a tread, the above gauge fluctuation exerts a bad influence upon the uniformity and balance of tires. Therefore, the development of a screw capable of suppressing pulsation even when the extrusion rate is increased is desired.

It is an object of the present invention which has been made in view of the above problem of the prior art to provide a screw for extruders capable of reducing the pulsation of an extruded product while a high delivery rate is maintained.

SUMMARY OF THE INVENTION

According to a first aspect of the present invention, there is provided a screw for use in an extruder for carrying a rubber material supplied from a hopper port at the rear of the cylinder of the extruder by the screw, molding it into a predetermined sectional form and extruding it from a nozzle attached to the end of the cylinder, wherein the height of a flight on an upstream side of the screw is made lower than the height of a flight on a downstream side.

According to a second aspect of the present invention, there is provided a screw for use in an extruder for carrying a rubber material supplied from a hopper port at the rear of the cylinder of the extruder by the screw, molding it into a predetermined sectional form and extruding it from a nozzle attached to the end of the cylinder, wherein the height of a flight portion located below the hopper port of the screw is lower than the height of a flight portion on a downstream side and continuously changes in a peripheral direction at a predetermined angle.

According to a tenth aspect of the present invention, there is provided a screw, wherein a portion where the height of the flight portion is lower than the height of the flight portion on a downstream side has an angle of 180° or less.

According to a third aspect of the present invention, there is provided a screw, wherein the number of threads on an upstream side of the screw is made smaller than the number of threads on a downstream side.

According to a fourth aspect of the present invention, there is provided a screw, wherein the interval of the threads on an upstream side is made wider than the interval of the threads on a downstream side.

According to a fifth aspect of the present invention, there is provided a screw, wherein the diameters of the threads on an upstream side of the screw are made larger than the diameters of the threads on a downstream side.

According to a sixth aspect of the present invention, there is provided a screw, wherein the height of the flight located below the hopper port is made 2 to 6% smaller than the diameter of the screw.

According to an eleventh aspect of the present invention, there is provided a process for producing a screw for use in an extruder for carrying a rubber material supplied from a hopper port at the rear of the cylinder of the extruder by the screw, molding it into a predetermined sectional form and extruding it from a nozzle attached to the end of the cylinder, the process comprising cutting away a peripheral portion of a flight portion located below the hopper port of an existing screw at a predetermined angle so that the height of the flight portion continuously changes in a peripheral direction to produce a screw having the flight portion located below the hopper port lower than the height of the flight portion on a downstream side.

According to a seventh aspect of the present invention, there is provided a process for producing a screw for extruder, wherein the amount of the peripheral portion cut away is 2 to 6% of the diameter of the screw.

According to an eighth aspect of the present invention, there is provided a process for producing a tire rubber member by using the screw according to any one of the second to sixth and ten aspects.

According to a ninth aspect of the present invention, there is provided a tire rubber member manufactured by using the screw according to any one of the second to sixth and ten aspects and having a gauge fluctuation of 0.15 mm or less.

DETAILED DESCRIPTION OF THE PREFERRED EMBODIMENT

A preferred embodiment of the present invention will be described hereinunder with reference to the accompanying drawings.

Figure 1:
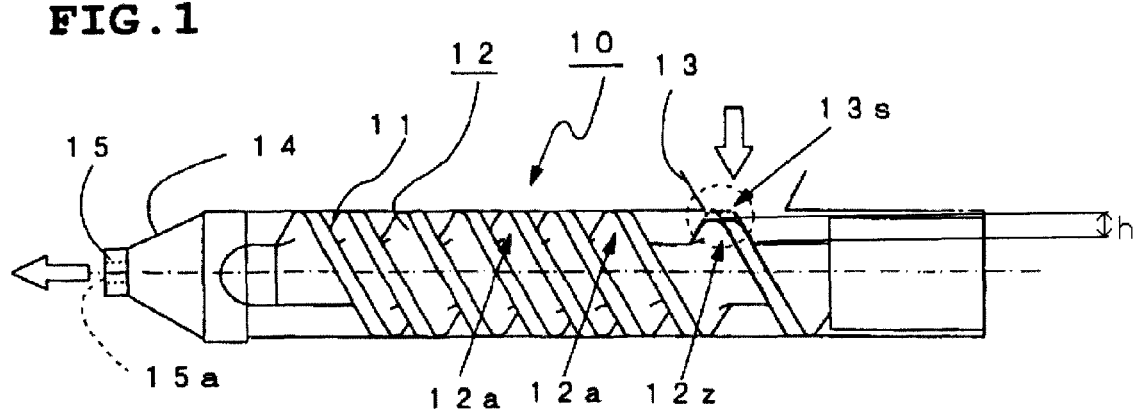
FIG. 1 is a diagram showing the constitution of an extruder according to an embodiment of the present invention.

FIG. 1 is a diagram of an extruder 10 having a screw for extruders according to an embodiment of the present invention. Reference numeral 11 denotes a cylinder as a container, 12 a screw which is rotatably fitted in the cylinder 11, 13 a hopper for injecting a rubber material heated with an unshown warming mill into the cylinder 11, 14 a head mounted to the end of the above cylinder 11, and 15 a nozzle attached to the end of the head 14 and having an opening 15a for molding the material into a predetermined required sectional form and detachable from the head 14 so that it can be exchanged according the type of an extruded product.

Figure 2A:
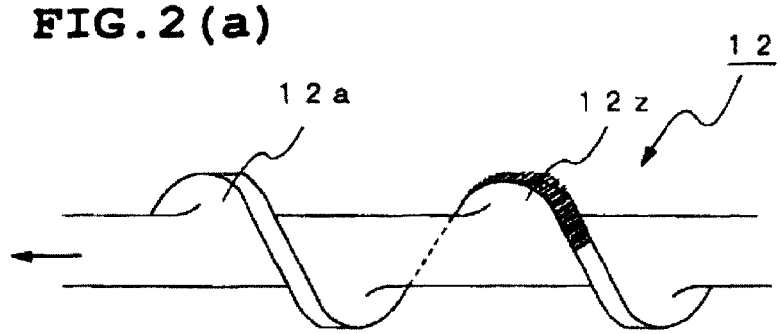
FIGS. 2(A) and 2(B) are partially enlarged views of a screw for use in the extruder according to the embodiment of the present invention.
Figure 2B:
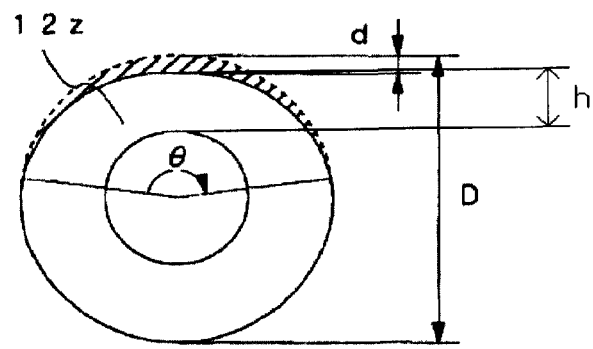
Figure 3:
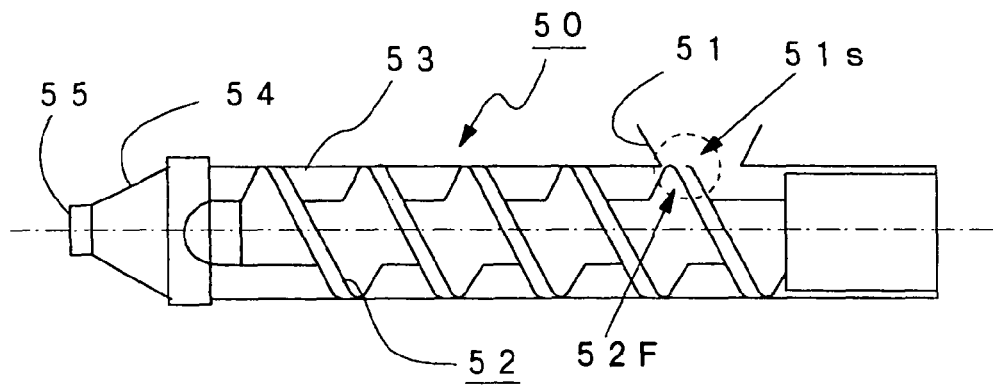
FIG. 3 is a diagram showing the constitution of an extruder of the prior art.

In this embodiment, a screw having a double-thread structure as a whole and a single-thread structure only on the hopper port 13s side near the inlet of the cylinder 11, in which a peripheral portion of a flight portion 12z is smoothly cut away at an angle θ so that the height "h" of the screw flight portion 12z crossing the hopper port 13s, that is, located below the hopper port 13s becomes smaller by a predetermined distance "d" than the diameter D of the screw 12 as shown in FIGS. 2(a) and 2(b) is used as the screw 12. More specifically, the above "d" is set to around 4% of the diameter D of the screw 12. The above θ is set to around 90° at maximum. The height of the flight portion 12a on a downstream side is the same as the diameter D of the screw 12.

Since the return of the material occurs in the vicinity of the hopper port 13s thereby, all the rubber material injected from the hopper port 13s is not forced into the cylinder 11. Therefore, a change in pressure applied to the above flight portion 12z in the vicinity of the hopper port 13s is reduced and the extrusion pressure is made uniform. Accordingly, the delivery rate of the extruded product extruded from the opening 15a of the nozzle 15 is made uniform, thereby making it possible to reduce the gauge fluctuation of the extruded product.

Figure 4:
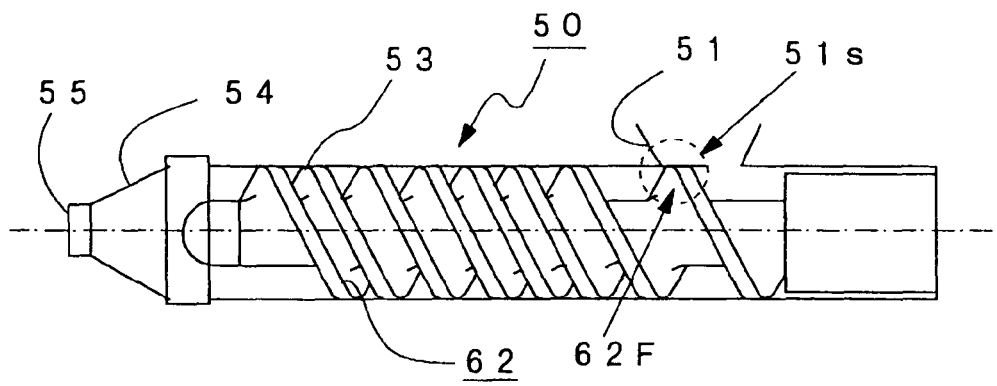
FIG. 4 is a diagram showing the constitution of a screw for use in an extruder having a high delivery rate.
Figure 5:
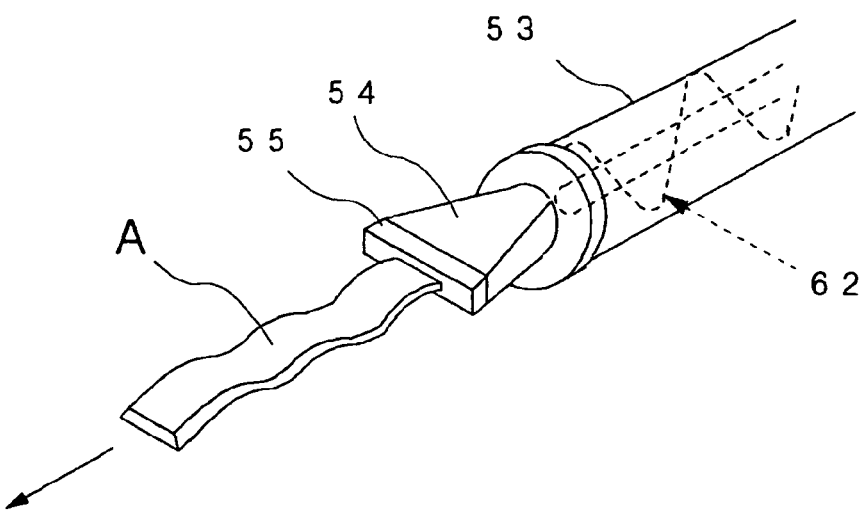
FIG. 5 is a diagram for explaining the gauge fluctuation of an extruded product.

When a tread was actually extruded and molded by using an extruder equipped with the above screw 12, the delivery rate was the same as the delivery rate of a screw 62 for high-delivery type extruders shown in FIG. 4 and (about 20%) higher than that of the prior art and still the gauge fluctuation of the tread was half (0.15 mm) of the gauge fluctuation (0.3 mm) when the above screw 62 was used.

In this embodiment, since the height of the flight portion 12z located below the hopper port 13s of the above screw 12 for extruders which carries a rubber material supplied from the hopper port 13s at the rear of the cylinder 11 of the extruder 10 is made lower than the height of the flight portion on a downstream side, the pulsation of the extruded product can be reduced while a high delivery rate is maintained.

When a tire rubber member is manufactured by using the above screw 12, it is possible to manufacture a high-precision tire rubber member having a gauge fluctuation of 0.15 mm or less.

In the above embodiment, the gauge fluctuation of the extruded product is reduced while the delivery rate is maintained by improving a high-delivery type screw 62 of the prior art. The present invention is directed not only to the above screw 62 but also to a screw having another structure such as a single-thread structure as a whole.

In the above embodiment, the screw 12 having a double-thread structure as a whole and a single-thread structure only on the hopper port 13s side is used. The thread structure of the screw is not limited to this. When a screw having a smaller number of threads on an upstream side than the number of threads on a downstream side, for example, two threads on an upstream side and three threads on a downstream side is used, the delivery rate of the extruded product is made uniform and the gauge fluctuation of the extruded product can be reduced.

Since the delivery rate of the extruded product can be made further uniform by making the interval of threads on an upstream side of the screw wider than the interval of threads on a downstream side or by making the diameters of the threads on an upstream side of the screw wider than the diameters of the threads on a downstream side, it is possible to further reduce the gauge fluctuation of the extruded product.

In the above embodiment, the peripheral portion of the flight portion 12z located below the hopper port 13s of the screw 12 for existing extruders is cut away. When a screw for extruders is to be newly manufactured, the height of a flight portion located below the hopper port 13s of the screw is made smaller by around 4% than the diameter of the screw 12.

The height of the flight portion 12z located below the hoper port 13s may be made 2 to 6% smaller than the diameter of the screw. When the above value "d" is smaller than 2%, the material rarely returns and the pulsation of the extruded product cannot be reduced fully. When the value is larger than 6%, the rubber material cannot be forced into the cylinder 11 smoothly, the delivery rate cannot be made uniform.

INDUSTRIAL FEASIBILITY

As described above, according to the present invention, since the height of the flight located below the hopper port of the screw for extruders is made lower than the height of the flight on a downstream side, the extrusion pressure and delivery pressure of the screw can be made uniform and the gauge fluctuation of the extruded product can be reduced while a high delivery rate is maintained.

When a tire rubber member is manufactured by using the above screw, a tire rubber member having an extremely small gauge fluctuation can be obtained.

What is claimed is:

1. A screw for use in an extruder comprising a cylinder for carrying a rubber material supplied from a hopper port at an upstream end of the cylinder by the screw, molding it into a predetermined sectional form and extruding it from a nozzle attached to a downstream end of the cylinder, wherein a height of a flight portion of that part of the screw located below the hopper port is lower than a height of a flight portion located on a downstream side, said height at said part varies continuously in a peripheral direction over a predetermined rotational angle of the screw and the predetermined rotational angle is an angle beginning 90° before a position where the height of the flight is lowest and ending 90° after the position where the height of the flight is lowest, and wherein the diameter of the screw located below the hopper port is between 2% and 6% smaller than the diameter of the screw at the downstream side owing to the reduced height of the flight at the part located below the hopper.

2. The screw according to claim 1, wherein a number of threads on an upstream side of the screw is made smaller than a number of threads on the downstream side.

3. The screw for use in an extruder according to claim 1, wherein an interval of the threads on an upstream side is made wider than an interval of the threads on the downstream side.

4. The screw for use in an extruder according to claim 1, wherein diameter of the thread on an upstream side of the screw are made larger than diameters of the threads on a downstream side.

5. The screw according to claim 1, wherein the cylinder has a consistent inner diameter from the hopper port to a last thread of the screw at the downstream end.

* * * * *